June 16, 1931.  L. N. LINSCOTT  1,810,358
FOUR-WHEEL BRAKE EQUALIZER
Filed May 11, 1929   2 Sheets-Sheet 2
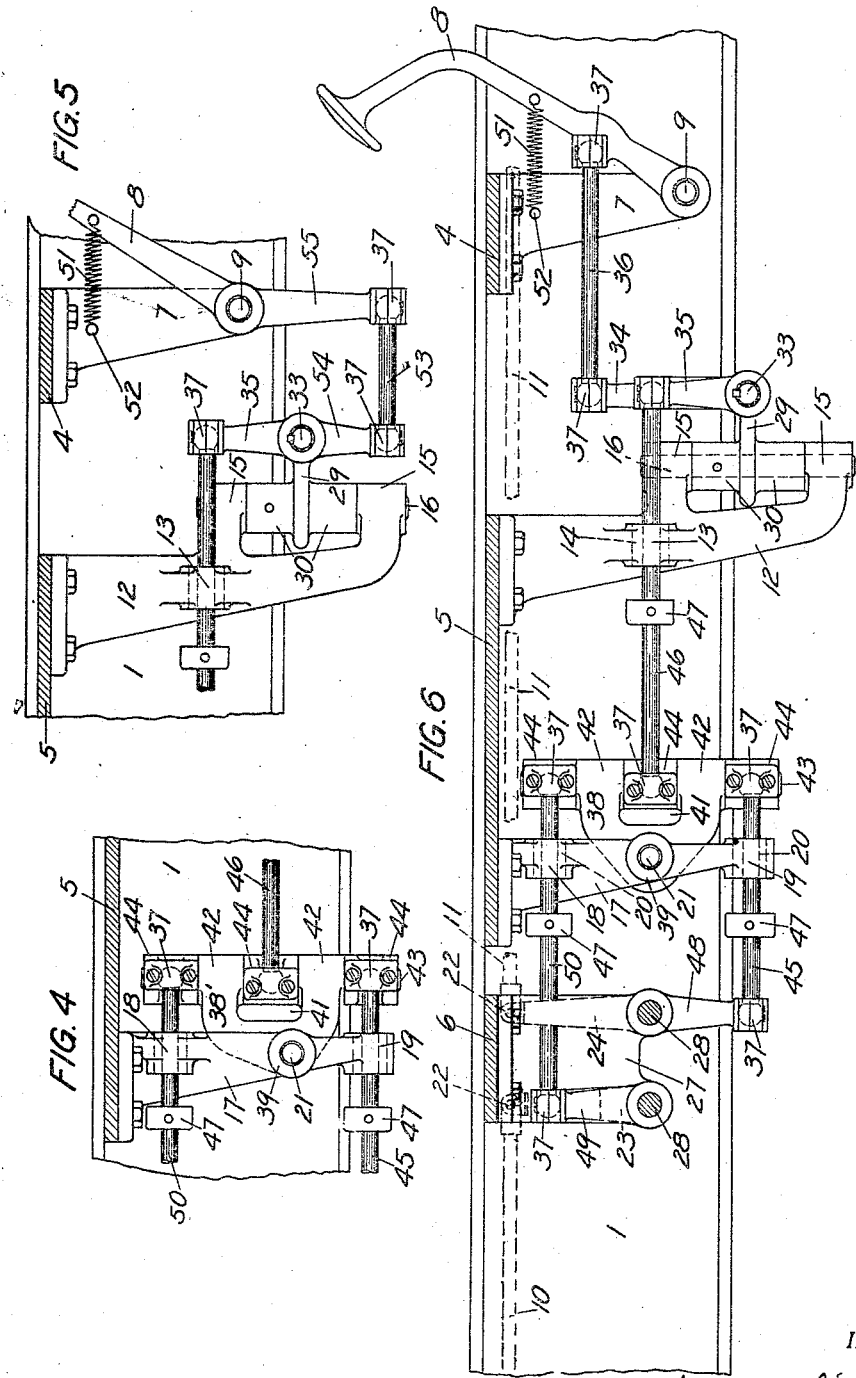
INVENTOR.
Leroy N. Linscott,
BY
Frank A. Cutter,
ATTORNEY.

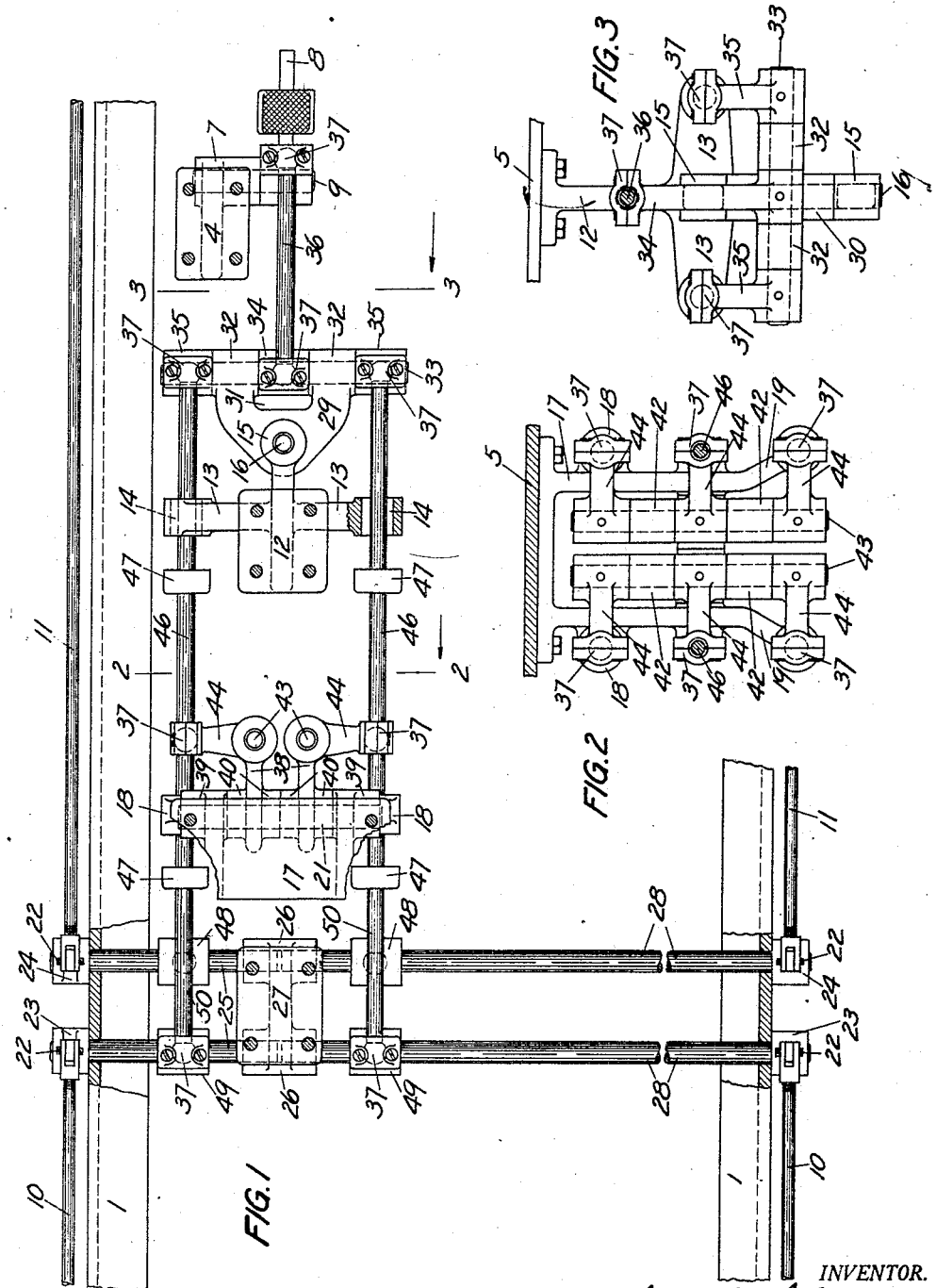

Patented June 16, 1931

1,810,358

UNITED STATES PATENT OFFICE

LEROY N. LINSCOTT, OF THOMPSONVILLE, CONNECTICUT

FOUR-WHEEL BRAKE EQUALIZER

Application filed May 11, 1929. Serial No. 362,245.

My invention relates to improvements in mechanisms from which hydraulic devices are excluded, hence are mechanical throughout, wherewith the pressure from brakes is applied to the four wheels of an automobile through the medium of longitudinally movable rods and rocking members that actuate the brake rods and cause them to set the brakes; and the objects of my invention are, first, to produce mechanism of this character by means of which any irregularity or irregularities in the pressure with which the four brakes are applied is equalized or compensated for and said brakes are applied with equal pressure to the four wheels with which they are associated, or uniformly even though there be a 60 to 40 ratio or some other approximately constant ratio as between the force exerted by the rear and front brakes; second, to afford safety means in said mechanism whereby is decreased the danger of accident due to breakage; and third, to provide means for varying the pressure exerted at the front and rear ends of the machine, for the purpose of preventing the front wheels from becoming "locked" before the rear wheels are under complete control of their brakes.

Other objects and advantages will appear in the course of the following description.

I attained the objects and secured the advantages of my invention by the mechanism illustrated in the accompanying drawings, in which—

Figure 1 is a top plan of an equalizer which embodies a practical form of my invention, certain parts being broken away, in sections, and omitted; Fig. 2, a transverse, vertical section through said equalizer or through two of the draw rods thereof, taken on lines 2—2, looking in the direction of the associated arrow, in Fig. 1; Fig. 3, a transverse, vertical section through the equalizer or through the foremost draw rod, taken on lines 3—3, looking in the direction of the associated arrow, in Fig. 1; Fig. 4, a detail, in side elevation, illustrating the means by which is varied the pressure exerted on the front and rear brake rods; Fig. 5, a detail, in side elevation, of modified means for operating the mechanism from the brake pedal, and Fig. 6, a side elevation, with parts in section and broken away, of the equalizer as illustrated in the first three views.

Similar reference characters designate similar parts throughout the several views.

Two channel-irons of the chassis of an automobile are represented in 1, and extending between and just below the upper flanges of said channel-irons, and rigidly secured to said flanges, are three horizontal plates, 4, 5, and 6. Each of the plates 4 and 6 is comparatively narrow while the plate 5 is comparatively wide. The plate 4 is in front of and the plate 6 is behind the plate 5. Depending from and rigidly secured to the forward plate 4 is a bracket 7, and a pedal 8 has its lowest terminal pivotally connected at 9 with said bracket at the lower terminal thereof.

Fragmentary portions of two rear brake rods are represented at 10, and fragmentary portions of two front brake rods are represented at 11, these brake rods are of usual construction and adapted, through any suitable means, to operate four brakes (not shown) of any approved construction.

A bracket 12 is rigidly secured at the upper end to the plate 5 adjacent to the forward end thereof, and said bracket has extending from opposite sides thereof two safety arms 13, in the outer terminals of which are passages 14 opening through the front and back sides of the arms, one of said passages appearing in full in Fig. 1. The bracket 12 is provided in front with two upper and under bearings 15, and a vertical shaft 16 is journaled in said bearings.

Having its upper end secured to the underside of the plate 5 adjacent to the rear end of said plate is an inverted U-shaped bracket 17, each descending part of which is provided on the outside near the top with a laterally extending safety arm 18, and at the base with an outwardly inclined safety arm or extension 19. In the outer ends of the arms 18 and in the lower ends of the extension 19 are passages that open through the front and rear sides of said arms and extensions, said passages being indicated by dotted lines 20, and similar to the passages 14. A horizontal shaft 21 is journaled in the vertical parts of the bracket 17 intermediate of the ends of said parts.

The brake rods 10 and 11 on each side are outside of the adjacent channel-iron 1, and said rods have their adjacent ends pivotally connected at 22—22 with the upper ends of two rocker arms 23 and 24, respectively.

One pair or set of arms 23 and 24 are mounted on and rigidly secured to two horizontal rock shafts 25 journaled in one of the channel-irons 1 and in bearings 26—26 at the bottom of a bracket 27, one of said bearings being behind the other. The other pair or set of arms 23 and 24 are mounted on and rigidly secured to two horizontal rock shafts 28 journaled in the other channel-iron 1 and in the bearings 26. All of the shafts 25 and 28 are in the same horizontal plane, and each shaft 28 is in line with one of the shafts 25. The bracket 27 is rigidly secured at the upper end of the underside of the plate 6.

A horizontal swivel 29 has an upper and under hub 30 which with said swivel are mounted on the shaft 16, and said swivel has a central recess 31 therein that opens through the front end thereof. The swivel 29 is provided on opposite sides of the recess 31 with bearings 32, and a horizontal rock shaft 33 is journaled in said bearings. The shaft 33 extends across the recess 31 and beyond the outer ends of the bearings 32. An upstanding long rocker arm 34 is mounted on and rigidly secured to the intermediate part of the shaft 33 that is in the recess 31, and two upstanding short arms 35 are mounted on and rigidly secured to the protruding terminals of said shaft.

An approximately horizontal rod 36 extends between and is pivotally connected with the pedal 8, at a point above the pivot 9, and the upper end of the arm 34, ball-and-socket or universal joints being employed between the forward terminal of said rod and said pedal, and between the rear terminal of said rod and said arm. These and the other universal joints hereafter referred to are designated by the numeral 37.

Two vertical swivels 38, generally similar to the horizontal swivel 29, have their rear ends loosely mounted on the shaft 21, between bearings 39—39 with which the bracket 17 is provided for said shaft, each of said swivels having a pair of hubs 40 at the end which is mounted on the shaft.

Each of the swivels 38 has a central recess 41 therein that opens through the front end thereof, is equipped with bearings 42 above and below said recess, and there is a vertical shaft 43 which is journaled in said bearings, extends across said recess, and projects above and below the two bearings. Three rocker arms 44 of equal length have their inner ends mounted on and rigidly secured to each of the two shafts 43. The arms 44 in the two sets of three extend in opposite directions from the shafts 43.

Two approximately horizontal pull rods 46 in approximately the same horizontal plane connect the intermediate arms 44 with the arms 35, four of the universal joints 37 being employed for that purpose. Each of the rods 46 passes through the opening 14 in one of the safety arms 13, and there is a safety collar 47 mounted on and secured to the rod behind said arm. The collars 47 are located on the rods 46 a sufficient distance from the arms 13 to avoid interfering with the normal movements of said rods. The openings 14 in the arms 13, through which the rods 46 pass, are sufficiently large to permit said rods to have all the freedom of movement necessary in the normal operation of the equalizer.

Mounted on and rigidly secured to the forward shafts 25 and 28, adjacent to the contiguous ends thereof, are two downwardly extending rocker arms 48; and mounted on and rigidly secured to the rear shafts 25 and 28, directly behind said arms, are two upwardly extending rocker arms 49. Two approximately horizontal pull rods 45 have their forward terminals connected by means of universal joints to the lower arms 44, and their rear terminals connected by means of universal joints with the lower ends of the arms 48. Two approximately horizontal pull rods 50 have their forward terminals connected by means of universal joints with the upper arms 44, and their rear terminals connected by universal joints with the upper terminals of the arms 49. The rods 45 are approximately in the same horizontal plane with each other, likewise the rods 50. The rods 45 pass through the openings 20 in the arms 19, and have mounted on and secured to the same behind said arms two of the safety collars 47. The rods 50 pass through the openings 20 in the arms 18, and are also provided with two of the collars 47 behind said arms. In both of these cases the safety collars are a sufficient distance from the safety arms to avoid interfering with the normal operation of the equalizer, and the openings 20 are large enough to afford all necessary movement on the part of rods 45 and 50.

When the pedal 8 is rocked forwardly on the pivot 9, the rear brake rods 10 are actuated forwardly and the forward brake rods 11 are actuated rearwardly, through the medium of the intervening mechanism and in accordance with the following explanation. In moving forward the pedal 8 carries with it the rod 36 and the latter rocks forward the arm 34. The arm 34 rocks the shaft 33 and the latter rocks the arms 35 forwardly. The arms 35 in their forward movement carry with them the rods 46, and said rods rock the intermediate arms 44 forwardly on the shafts 43. The shafts 43 are rocked with the intermediate arms 44 and carry with them the upper and lower arms 44. The upper arms 44 in moving forwardly carry with them the rods 50, and the latter in turn swing the arms 49 forwardly, whereby the rear shafts 25 and 28 are rocked and swing the arms 23 forwardly, said last-named arms taking with them the rods 10. The lower arms 44 in moving forwardly carry with them the rods 45, and they in turn rock forward the arms 48 and thereby cause the front shafts 25 and 28 to be rocked in the direction to actuate rearwardly the arms 24 and with the latter the rods 11. While these operations are taking place the swivel 29 may swing in either direction on the shaft 16, and each of the swivels 38 may swing in either direction (up or down), to compensate for any irregularity in the braking elements, with the result that the rods 10 and 11 are caused to impart to the brakes themselves an equal or universally even pressure.

If the resistance offered by either the brake rod 10 or the brake rod 11 on one side be unequal, said resistance is transmitted through one or the other of the shafts 25, or of the shafts 28, to the associated swivel, through the intervening parts and members, and said swivel rocks in the direction to equalize the pressure. And if there be an excess of resistance on the part of the rods 10 and 11 on one side over that on the part of the rods 10 and 11 on the other side, said resistance is transmitted through either the shafts 25 or the shafts 28 and the intervening parts and members to the swivel 29, and the latter moves on its axis to bring about the necessary equalization. Thus it is seen that one of the swivels 38 equalizes the brake rods on one side relatively, and that the swivel 29 equalizes the brake rods on both sides relatively.

As soon as the pedal 8 is released the parts and members of the equalizer assume their former, initial, or normal positions, and pressure on the brake rods 10 and 11 is removed. Various means may be employed for restoring the equalizer to normal or initial condition, such, for example, as a spring 51 attached at the rear and to a pin 52 set in one side of the bracket 17, and at the front end to the pedal 8, as shown in Figs. 5 and 6.

In the event either pull rod 46 or its connections break at a point behind the collar 47 thereon, said rod is immediately drawn forward until said collar contracts with the arm 13 through which the rod passes. A fulcrum or anchorage is thus provided against which the associated moving parts operate, or on which they draw, with a result that the brake rods on one side are operating to set the brakes controlled thereby. If either pull rod 50 or its connections break behind the collar 47 thereon, said collar is drawn into contact with the arm 18 through which the rod passes, or if the rear brake rod 45 or its connections break behind the collar 47 on said rod, said collar impinges on the arm 19 through which the rod passes. In either event the collar abuts the arms so that member 42 is held against swinging on its pivot 21 so that a movement of rod 46 will swing shafts 43 and actuate either rod 45 or 50.

If it be desired to vary the force exerted by the rods 10 and 11 on the rear and front brakes, respectively, in order that the rear rods shall act more quickly and with greater force than the front rods, the rock shaft 21 may be placed lower in the bracket 17 and pass through the vertical swivels at points nearer the bottom thereof than in the other construction where said shaft is in the same approximately horizontal plane with the pull rods 46, and pressure is applied with equal force to all four of the brake rods. An example of this condition is illustrated in Fig. 4, wherein a swivel 38' is mounted on the shaft 21 at a point below a continuation of the axis of the draw rod 46 connected with the intermediate arm 44 carried by said swivel. Obviously, when the rod 46 in this case is actuated forwardly, the swivel 38' is rocked downwardly, with the result that a quicker and more powerful force is exerted on the rod 50 and therefore on the brake rods 10 than is exerted on the rod 45 and therefore on the brake rods 11. The amount of forward movement imparted to the three arms 44 carried by the swivel 38' is the same, but said swivel in rocking downwardly draws forward the rod 50 and moves rearwardly the rod 45, in consequence of which the movement transmitted by said first-named rod to the connected arm 49 is greater than that transmitted by the rod 45 to the connected arm 49. This may be a 60—40 ratio or some other as desired, and depends on the distance of the axis of the shaft 21 below a continuation of the axis of the rod 46 which is connected with the swivel.

Instead of operating the equalizer with a pull rod at the front end, said equalizer may be operated by means of a push rod, as 53—see Fig. 5. Here there is a rocker arm 54 which extends downwardly from the rock shaft 33, in place of the upwardly extending arm 34, and a downward extension 55 from the pedal 8. The rod 53 is connected at opposite ends, by means of two of the universal joints 37, with the arm 54 and the extension 55, respectively. In this case the forward movement of the pedal 8 produces the same result as in the other case, because the rearward movement of the extension 55 imparts a like movement to the arm 54, through the medium of the rod 53, and the arms 35 are accordingly rocked forward.

More or less change in the shape, size, construction, and arrangement of some or all the parts of this equalizer may be made without departing from the spirit of my invention or exceeding the scope of what is claimed.

I claim:

1. In an equalizer of the class described, mechanism connected with four brake-actuating elements, said mechanism including a series of rocker arms and operating rods therefor, and also including swivels which carry certain of said arms.

2. In an equalizer of the class described, mechanism connected with four brake-actuating elements, said mechanism including a series of rocker arms and operating rods therefor, and also including swivels which carry certain of said arms, and means to operate said mechanism from a single point.

3. In an equalizer of the class described, a forward horizontal swivel and a pair of rear vertical swivels, rocking members carried by said horizontal swivel, rocking members carried by said vertical swivels, means to operate from said rocking members carried by said horizontal swivel said rocking members carried by said vertical swivels, and means operated by said arms carried by said vertical swivels to actuate four brake-actuating elements.

4. In an equalizer of the class described, a forward horizontal swivel and a pair of rear vertical swivels, rocking members carried by said horizontal swivel, rocking members carried by said vertical swivels, a pedal, means to operate from said pedal said rocking members carried by said horizontal swivel, means to operate from said rocking members carried by said horizontal swivel said rocking members carried by said vertical swivels, and means to operate by said rocking members carried by said vertical swivels four brake-actuating elements.

5. In an equalizer of the class described, a forward horizontal swivel and a pair of rear vertical swivels, rocking members carried by said horizontal swivel, rocking members carried by said vertical swivels, means to operate from said rocking members carried by said horizontal swivel said rocking members carried by said vertical swivels, rocking members adapted to be connected with and actuate four brake elements, and means to operate said last-named rocking members from said rocking members carried by said vertical swivels.

6. In an equalizer of the class described, a forward horizontal swivel and a pair of rear vertical swivels, rocking members carried by said horizontal swivel, a pedal, means to actuate said rocking members from said pedal, rocking members carried by said vertical swivels, means to operate from said rocking members carried by said horizontal swivel said rocking members carried by said vertical swivels, rocking members adapted to be connected with and actuate four brake elements, and means to operate said last-named rocking members from said rocking members carried by said vertical swivels.

7. The combination, in a four-wheel brake equalizer, with a swivel carrying a shaft, arms secured to said shaft, other swivels carrying shafts, arms secured to said shafts, and pull rods pivotally connected with said first- and second-named arms to actuate the latter from the former, of operating means for said first-named arms, and means operated by said second-named arms to actuate four brake elements.

8. The combination, in a four-wheel brake equalizer, with a pedal, of a horizontal swivel carrying a shaft, arms rigidly secured to said shaft, a rod pivotally connected with said pedal and with one of said arms, two vertical swivels mounted side by side and carrying shafts, arms secured to said shafts, pull rods pivotally connected with certain of said first-named arms and with certain of said second-named arms, whereby the latter are operated from the former, and means to operate said second-named arms to actuate four brake elements.

9. The combination, in a four-wheel brake equalizer, with four shafts arranged two in line with each other in front and two in line with each other behind, provided with arms for the connection therewith of four brake rods, and further provided with arms two of which extend upwardly from one set of aligning shafts and two of which extend downwardly from the other set of aligning shafts, of a horizontal swivel carrying a shaft, arms secured to said shaft, two vertical swivels mounted side by side and carrying shafts, arms secured to said shafts, pull rods pivotally connected with the arms mounted on the shaft carried by said horizontal swivel and the arms mounted on the shafts carried by said vertical swivels, and means to actuate from said last-named arms said upwardly and downwardly extending arms, whereby said brake rods are actuated.

10. The combination, in a four-wheel brake equalizer, with four shafts arranged two in line with each other in front and two in line with each other behind, provided with arms for the connection therewith of four brake rods, and further provided with arms two of which extend upwardly from one set of aligning shafts and two of which extend downwardly from the other set of aligning shafts, of a horizontal swivel carrying a shaft, arms secured to said shaft, two vertical swivels mounted side by side and carrying shafts, sets of three arms each secured to said shafts, pull rods pivotally connected with the arms mounted on the shaft carried by said horizontal swivel and the intermediate arms mounted on the shafts carried by said vertical swivels, and means to actuate from the upper and lower arms mounted on the shafts carried by said vertical swivels said upwardly and downwardly extending arms, respectively, whereby said brake rods are actuated.

11. In an equalizer of the class described, members movable in different planes and adapted to actuate four brake elements, means to move said members in said planes, and means to enable certain of said members to be moved out of the courses of their normal directions of movement.

12. In an equalizer of the class described, a member arranged to rock in a horizontal plane, and carrying members arranged to rock in vertical planes, two members arranged to rock in vertical planes, and carrying members arranged to rock in approximately horizontal planes, means to cause said last-named members to be rocked from said second-named members, means to transmit motion from last-named members to four brake elements, and means to rock said second-named members.

13. In an equalizer of the class described, vertically and horizontally arranged rocking members and connecting members between them, a horizontal support for said vertically arranged members, which support is movable on a vertical axis, vertical supports for said horizontally arranged members which vertical supports are movable on a horizontal axis, and means to transmit movement from said horizontally arranged members to four brake elements.

14. The combination, in an equalizer of the class described, with a pedal, of vertically and horizontally arranged rocking members and connecting members between them, a horizontal support for said vertically arranged members, which support is movable on a vertical axis, vertical supports for said horizontally arranged members, which vertical supports are movable on a horizontal axis, means to transmit movement from said horizontally arranged members to four brake elements, and means to operate from said pedal said vertically arranged members.

15. In an equalizer of the class described, mechanism connected with four brake-actuating elements, said mechanism including a series of rocker arms and operating rods therefor and swivels which carry certain of said arms which are operable in opposed planes.

16. In an equalizer of the class described, mechanism connected with four brake actuating elements which includes a plurality of brackets, a plurality of swivels mounted on certain of said brackets, a plurality of rocker arms on said brackets and said swivels and rods operatively connecting said arms.

LEROY N. LINSCOTT.